United States Patent [19]

Lush

[11] 4,099,703
[45] Jul. 11, 1978

[54] SELF-CLEANING PRECISION METERING VALVE

[75] Inventor: William Lush, Cheyenne, Wyo.

[73] Assignee: Ideal-Aerosmith, Inc., Cheyenne, Wyo.

[21] Appl. No.: 731,523

[22] Filed: Oct. 12, 1976

[51] Int. Cl.² .......................... F16K 1/38; F16K 1/52
[52] U.S. Cl. .................... 251/122; 251/205; 251/285
[58] Field of Search ............. 251/122, 285, 205; 137/244

[56] References Cited

U.S. PATENT DOCUMENTS

| 2,925,242 | 2/1960 | Griswold | 251/117 |
| 2,977,087 | 3/1961 | Lindgren et al. | 251/285 X |
| 3,119,449 | 1/1964 | Price | 251/285 X |
| 3,342,451 | 9/1967 | Matousek | 251/285 X |
| 3,409,271 | 11/1968 | Kallenbach | 251/265 |
| 3,419,246 | 12/1968 | Burgess | 251/285 X |
| 3,441,249 | 4/1969 | Aslan | 137/556 X |

Primary Examiner—Arnold Rosenthal
Attorney, Agent, or Firm—John E. Reilly; James R. Young

[57] ABSTRACT

An adjustable needle valve provided with an orifice and a needle valve stem is characterized by a finely calibrated adjustment means connected to the valve stem for controlling variations in the flow of fluid in a system, the needle valve stem being biased so as to be normally urged toward an orifice to restrict the flow of fluid, but which can be manually retracted from the orifice to a position allowing a full stream of fluid to flow through the orifice to flush out foreign particles which may have lodged between the orifice and the needle valve stem. When the needle valve stem is released, it returns to its previously adjusted position within the orifice without having to be reset by the adjustment means.

9 Claims, 4 Drawing Figures

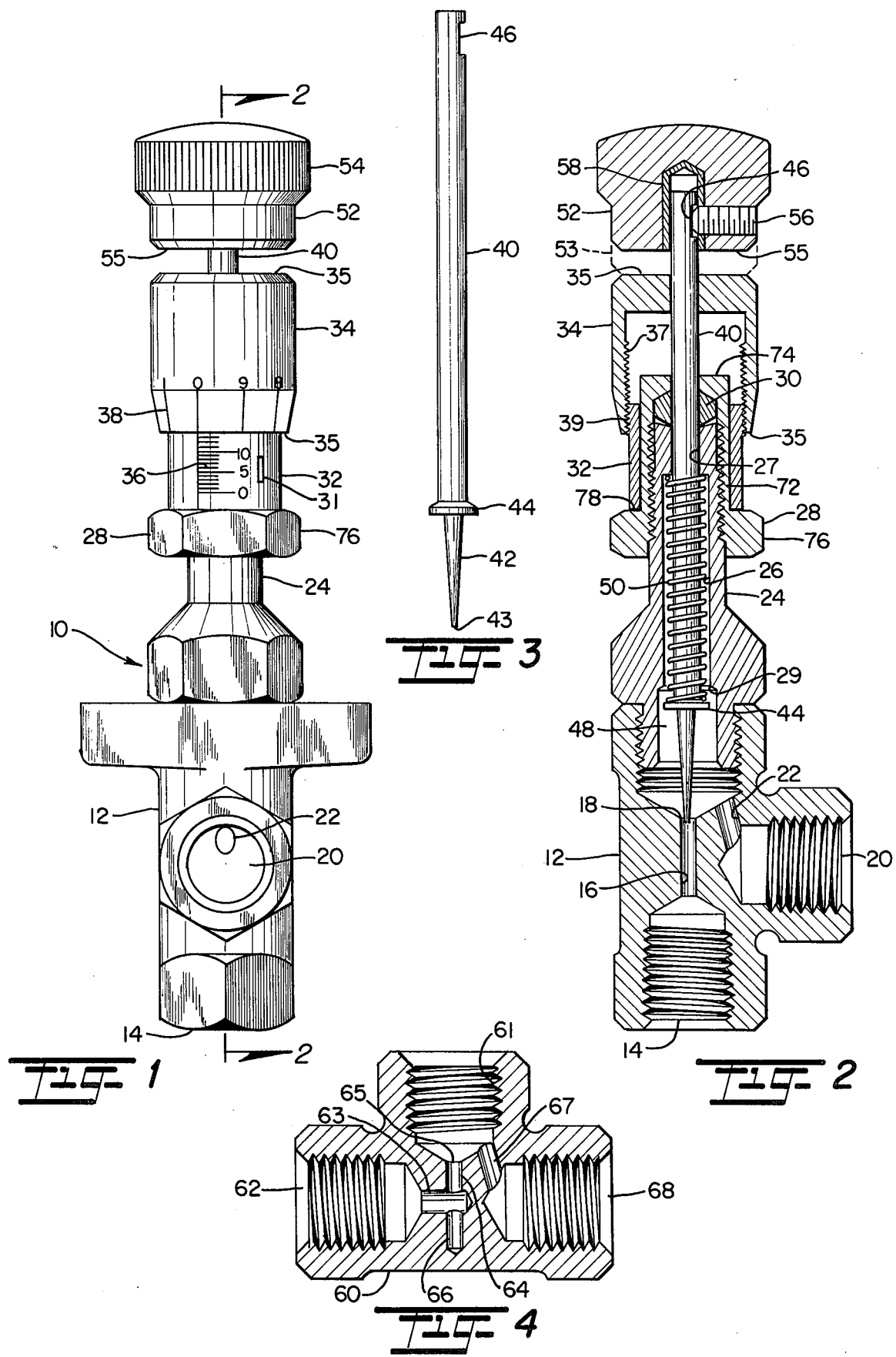

SELF-CLEANING PRECISION METERING VALVE

BACKGROUND OF THE INVENTION

This invention relates to valves, and more specifically to an adjustable self-cleaning, vernier control needle valve.

Metering valves utilizing a needle and seat arrangement are commonly used for adjustably metering and controlling low flat rates of fluids. A problem normally encountered with the use of such valves is the tendency of the valve to accumulate debris and foreign matter in the area of restricted flow between the needle and orifice, resulting in fluctuations and inaccuracies in the flow of fluids through the valves. In the past, to clean the valve, it has been necessary either to reverse the flow of fluid through the valve or alter the adjustment to open the valve allowing the greater flow rate of the fluid to wash the debris out of the needle and orifice area. Such adjustment or reversal of fluid flow has been found to be difficult and impractical particularly in precision or needle-type metering valves, since it requires that the valve be reset to its original position after flushing which is time-consuming and subject to error and in the past no provision has been made in precision metering valves for a means to allow quick and easy opening of the needle and orifice area to allow the debris to be flushed through the valve and then returned to the former precise setting without requiring re-adjustment of the valve.

SUMMARY OF THE INVENTION

Accordingly, it is an object of the present invention to provide a precision flow needle and orifice-type adjustable valve in which the needle can be quickly withdrawn from the orifice area to allow full stream flow for flushing foreign debris through the valve and can be quickly returned to its former setting without the necessity of resetting the adjustment.

It is another object of the present invention to provide a needle and orifice-type valve which can be quickly and periodically opened to a full flow setting and returned to its former setting in combination with a precision caliper flow adjustable apparatus for fine setting the position of the needle in the orifice.

The precision adjustable self-cleaning valve of the present invention includes an orifice inlet into an internal chamber and a separate outlet from said chamber with said orifice inlet including a seat around its circumference, and a needle valve stem with a tapered, conically-shaped portion for adjustable insertion into said orifice to adjustably vary the effective cross-sectional area of flow through said orifice. The valve stem is rigidly attached to a cap member and contains a compression spring acting upon said needle valve stem to bias said needle valve toward the orifice and to maintain said cap member in abutting contact with a threadedly adjustable thimble which controls the extent of penetration of said conically shaped needle portion into said orifice. The valve is arranged so that a manual lifting force sufficient to overcome the compressive strength of the spring can be applied to the cap portion to withdraw the conically-shaped needle point from the orifice to allow maximum clearance resulting in a full stream flow of liquid through the valve for cleaning and flushing foreign debris from the orifice area of the valve. Release of the pulling force on the cap member allows the spring pressure to urge the valve stem back into its former precision adjusted position.

The threaded thimble includes calibrated graduations similar to those found on a well-known micrometer caliper to enhance precision adjustment of the valve.

BRIEF DESCRIPTION OF THE DRAWINGS

Other objects, advantages and capabilities of the present invention will become more apparent as the description proceeds, taken in conjunction with the accompanying drawings, in which:

FIG. 1 is an elevational view of the preferred form of the self-cleaning precision valve;

FIG. 2 is a cross-sectional view of the valve taken along lines 2—2 of FIG. 1;

FIG. 3 is an elevational view of the valve stem shown removed from the remainder of the valve; and FIG. 4 is a cross-sectional view of an alternative embodiment showing an alternate arrangement of the intake port of the valve.

DETAILED DESCRIPTION OF THE PREFERRED EMBODIMENT

A preferred form of precision adjustable self-cleaning valve 10 in accordance with the present invention is shown in FIGS. 1 and 2 which is comprised of a main body portion 12 including an inlet port 14 at the bottom and an outlet port 20 at one side. A bonnet 24 is threadedly received into the upper portion of the main body 12. The bonnet 24 is threadedly attached to the top of the main body portion 12 and includes a valve guide bore 27 at its upper end, an enlarged spring housing bore 26 at its midsection, and a still further enlarged bore forming an internal chamber 48 at its lower end. A valve stem 40 is positioned in the bore of said bonnet 24, and a packing nut 28 is threadedly received over the upper end of bonnet 24 to retain a packing 30, such as an O-ring seal around the valve stem 40.

The packing nut 28 includes a cylindrical body portion 72, a top retaining portion 74 for retaining the packing 30 in position, and a radially enlarged shoulder portion 76 with a flat guide surface 78 at the lower end. The enlarged shoulder portion 76 may be conveniently shaped so as to provide a hexagonal periphery to be engaged by a tool for screwing the packing nut 28 into position. A sleeve 32 is fitted snugly around the body portion 72 of packing nut 28 with its lower extremity abutting the guide surfaces 78 and is provided with fine, micrometer-style external threads 39 at its upper end. A thimble 34 with a top abutment surface 35 and with internal micrometer-style threads 37 is threadedly received on said sleeve 32.

The upper end of the valve stem 40 protrudes through the center of the thimble 34 and into a cap member 52 which is positioned directly over and in abutting relation to thimble 34. A sleeve insert 58 is provided within cap 52 and encompasses the upper end of valve stem 40. The upper end of valve stem 40 is immovably locked within cap 52 by a set screw 56 jammed into the recessed area 46 in valve stem 40 such that any movement of the cap 52 imparts corresponding movement to the valve stem 40. The cap 52 has a knurled peripheral surface 54 to enhance gripping or manual pulling on the cap 52.

Fluid enters the valve 10 through inlet port 14 and continues into the internal chamber 48 via the inlet conduit 16. The fluid exits the valve from chamber 48 through outlet conduit 22 and outlet port 20. The upper end of inlet conduit 16 defines an orifice 18 through which the fluid enters the chamber 48.

As best seen in FIGS. 2 and 3, the tapered lower end 42 of valve stem 40 is needle-shaped in the form of an inverted cone with a constantly decreasing diameter toward the lower pointed extremity 43, the larger cross-sectional area of the end 42 adjacent to collar 44 being slightly greater than that of the orifice 18. The valve stem 40 is positioned such that its tapered lower end 42 can be inserted into the orifice 18 to restrict the flow of fluid into the chamber 48. As can be appreciated, the effective cross-sectional area of the orifice 18 through which fluid can flow is decreased as the tapered end 42 is progressively lowered or inserted into the orifice until it reaches a completely closed position, in which the diameter of the lower tapered end 42 corresponds to that of the orifice 18 and effectively stops the flow of fluid through the valve. Alternatively, when the tapered lower end 42 is nearly or completely withdrawn from the orifice 18, a full stream of fluid is allowed to flow through the valve.

A compression spring 50 for urging the valve stem 40 toward the closed condition is positioned around the midsection of the valve stem 40 and within the enlarged spring housing bore 26 in bonnet 24. The spring is retained in position on one end by the collar 44 on valve stem 40 and on the opposite end by the underside of the valve guide 27 which defines the top of the enlarged bore 26. The spring 50 bears in compression against the top of the enlarged bore 26 and the collar 44 so as to bias the valve stem 40 in a downward direction toward the orifice 18. Since the valve stem 40 is biased in the downward direction, and it is immovably positioned within the cap 52 as described above, the underside 55 of the cap 52 is normally urged against the contact or abutment surface 35 of the thimble 34 as indicated by the phantom line 53. Consequently, as the thimble 34 is turned in one direction, the micrometer threads 37 and 39 interact to move the thimble 34 in a downward direction which also allows the cap 52 to follow the thimble 34 in a downward direction resulting in the tapered end 42 of the valve stem 40 being inserted farther into the orifice 18 thereby restricting the flow of fluid through the valve. Alternatively, turning the thimble 34 in the opposite direction results in drawing the tapered end 42 of valve stem 40 against the spring pressure out of the orifice 18 allowing a greater flow of fluid through the valve.

Linear graduations 36 are provided on the external surface of sleeve 32 similar to well-known micrometer graduations to assist in calibrating precise settings of the valve by using the lower peripheral surface 35 of the thimble 34 as an indicator for the graduations 36. Radial graduations 38 are also provided around the lower peripheral surface of the thimble 34 to make it possible to calibrate the opening of the valve in even more precise dimensions. The radial graduations 38 include ten equally spaced graduations around the peripheral surface of the thimble 34. The lineal distance between each graduation at 36 indicates the linear distance traveled by the thimble 34 through one revolution. Consequently, radial graduations 38 serve to divide the lineal graduations 36 into tenths. As can be appreciated, this type of calibration is conducive to greater accuracy.

In order to insure that the valve allows no flow at zero vernier setting and definite repeatable flows at other respective settings, the vernier scale should be preset. It should first be determined which position of the vernier graduations would provide optimum view when the valve is installed. The graduations 36 can be moved to that position by rotating the sleeve 32 with respect to the packing nut 28. A slot 31 for accommodating a screw driver blade or other similar tool can be provided in the sleeve 32 to assist in rotating the sleeve 32. After rotation the lower extremity of sleeve 32 should be abutted against the flat upper guide surface 78 of shoulder 76.

Then with the needle 43 in closed position in orifice 18, the zero radial graduation 38 on thimble 34 can be aligned with the vernier zero of the graduations on sleeve 32. While holding the thimbler 34 in this position, the cap 52 should be placed so that its underside 55 is snug against the abutment surface 35 of thimble 34, and the set screw 56 in cap 52 should then be tightened firmly against the recessed area 46 of valve stem 40. This procedure should result in all the parts of the vernier being positioned correctly so that when the valve is closed the vernier will read zero with the cap 52 abutted snugly against the thimble 34.

Since precision valves of the type described herein are normally used in applications for extremely small rates of flow of the fluid through the valves, the effective cross-sectional flow area through the orifice is quite small. Consequently, it is quite common to have foreign particles and debris lodge in the orifice between the sides of the orifice and the tapered end 42 of the valve stem 40. Such an accumulation of foreign particles further restricts the flow of fluid through the valves and results in variations of flow and inaccuracies.

In order to dislodge the foreign particles and clear the valve, it is necessary to either reverse the flow of the fluid through the valve, which may not be possible or practical in the particular system in which the valve is applied, or by opening the valve to allow a full stream of fluid to flow through the orifice thereby flushing the foreign particles through the valve and the outlet port 20. The extremely fine micrometer-type threads 37 and 39 are not conducive to quick withdrawal of the conical lower portion 42 of the valve stem from the orifice, and when the clearing process is accomplished in this manner, the valve must be reset to its prior calibrated position to continue the metered flow of fluid at the desired rate.

In the embodiment of the present invention, however, the tapered end 42 of valve stem 40 can be temporarily, but quickly withdrawn from the orifice 18 by simply applying a lifting force on the cap 52 sufficient to overcome the compressive strength of the spring 50. The upward travel of the valve stem 40 is limited by the collar 44 contacting the collar seat 29 in the bonnet 24; however, there is sufficient travel available to completely withdraw the lower extremity 43 from the orifice 18. When the pulling force is released from the cap 52, the spring pressure returns the conical portion 42 of the valve stem 40 to the precise position within the orifice 18 that it occupied prior to the withdrawal. In other words, the valve can be quickly moved to its full open position, and perhaps repeatedly opened with a series of rapid movements to assist in flushing the particles out of the valve, then allowed to return to its prior calibrated position without the requirement of recalibrating the valve by turning the thimble. It can be appreciated that this cleaning feature is a significant improvement over the cleaning procedures required by the prior art valves.

An alternate embodiment for a main body portion 60 is shown in FIG. 4 for use in straight flow. The bonnet 24 is threadedly attached to the top 61 of the main body portion 24 exactly as described in the preferred embodiment, but the inlet port 62 is longitudinally aligned with the outlet port 68. The inlet conduit of this alternate embodiment is comprised of a horizontal segment 63 and an intersecting vertical segment 64. The top of the vertical segment 64 defines an orifice 65 which receives the tapered lower end 42 of the needle valve stem 40 for controlling the flow rate as described above for the preferred embodiment. The lower end 66 of the vertical segment 64 must be deep enough to receive a sufficient portion of the tapered lower end 42 of the needle valve stem 40 to allow the orifice to be completely closed by the needle valve. An outlet conduit 67 established communication between chamber 44 and the outlet port 68. Although not shown in the drawings, it can also be appreciated that the main body portion is conducive to an additional embodiment in which an inlet port is oriented substantially normal to both the bonnet and the outlet port, utilizing intersecting inlet conduit segments similar to those described in the alternate embodiment. It is further understood that this intersecting conduit segment concept is conducive to arrangement of the bonnet, inlet port, and outlet port at any desired angular relation to each other.

The precision adjustable, self-cleaning valve of the present invention is particularly appropriate for such purposes as introducing a relatively minute but constant flow of liquid chemical additive into a larger system, for example, adding a chemical treatment to a water system for dissolving iron deposits or for purification treatment with a chlorine additive. If the system requires numerous additives, the several respective valves, each embodying this invention, could be placed in close proximity to each other so a maintenance person perhaps on periodic inspection rounds would be able to very quickly and efficiently pull the retraction means on each valve for cleaning, without having to reset the vernier calibration on each one. The valves are also suitable for use in a more automatic system such as by attaching retraction means comprising pneumatic cylinders or electric solenoids to the valve stem for periodic withdrawal of the needle valve stem from the orifice for cleaning. Again, the vernier calibration would not have to be reset after each withdrawal of the needle valve, and the pneumatic cylinders or electric solenoids could be automatically activated based on time intervals, system pressure fluctuations, flow rate fluctuations, and the like.

An example of a system in which a valve in accordance with the present invention can be beneficially used is in a home lawn sprinkling system wherein a chemical rust control solution is added to the sprinkling water to hold iron in suspension and help stop rust stains on homes, patios, and sidewalks. Since the iron content of water varies from location to location, such a system could be preset to feed the proper amount of chemical into the sprinkler system through the valve of this invention by a skilled technician who can test the water and who is familiar with the chemical requirements. The homeowner could then periodically clean the valve as described herein without danger of altering the adjusted setting of the needle in the orifice, thereby eliminating any need to call on the technician whenever the valve gets clogged or keep a record of the required valve setting.

Although the present invention has been described with a certain degree of particularity, it is understood that the present disclosure has been made by way of example and that changes in details and structure may be made without departing from the spirit thereof.

What is claimed is:

1. A valve apparatus, comprising:
   an enclosed chamber, an orifice in said chamber through which fluid enters said chamber, and an unrestricted outlet through which fluid exits said chamber into a flow line;
   an elongated longitudinally movable valve stem positioned in said chamber with a tapered end portion longitudinally aligned with said orifice;
   a main body member partially enclosing said chamber including said orifice and said outlet port and a bonnet member attached to said main body member and enclosing the remainder of said chamber, said bonnet member having a bore through which said valve stem protrudes into said chamber with a portion of said valve stem extending externally of said bonnet member;
   bias means associated with said valve stem for normally urging said valve stem toward said orifice;
   retraction means connected to said valve stem positioned externally of and longitudinally beyond said bonnet member for applying force to retract said valve stem from said orifice against the pressure of said bias means, said retraction means being operative to forcibly withdraw said valve stem in the direction of removal from said orifice;
   a cylindrical sleeve with graduations on a portion of its external surface, said sleeve being slidably mounted around said bonnet in a manner which limits longitudinal movement while allowing rotational movement of said sleeve in relation to said bonnet such that said graduations can be positioned for optimum viewing; and
   adjustment means attached to said sleeve and associated with said retraction means for adjustably limiting the longitudinal distance said bias means is allowed to move said valve stem toward said orifice by limiting the inwardly directed longitudinal movement of said retraction means, said adjustment means registering on said graduations to indicate the setting of said adjustment means in relation to said sleeve.

2. The valve apparatus of claim 1, wherein said adjustment means is movably attached to said bonnet member and adjustably extends beyond said bonnet member in concentric relation to said valve stem, and wherein said retraction means includes an enlarged cap portion on the external end of said valve stem which is independently extendable beyond said adjustment means and is normally biased against said adjustment means by the force of said bias means on said valve stem.

3. The valve apparatus of claim 2, wherein said adjustment means includes a rotatable thimble threadedly attached to said valve such that rotation of said thimble in one direction results in outward longitudinal movement of said thimble in relation to said valve and rotation of said thimble in the opposite direction results in inward longitudinal movement of said thimble, the edge of said thimble serving as an indicator for registering on said graduations on said sleeve.

4. The valve apparatus fo claim 1, wherein said cap portion is removably and adjustably attached to the distal end of said valve stem external of said bonnet such that the axial distance of said cap portion from said tapered end portion of said valve stem can be adjustably varied to register the lower end of said thimble on a desired graduation on said sleeve when the valve is completely closed regardless of the rotational position in which said sleeve is set.

5. A valve apparatus, comprising:

a main body portion provided with an inlet port, an outlet port, an intermediate cavity, an inlet conduit connecting said inlet port with said cavity, and an outlet conduit connecting said cavity with said outlet port, whereby fluid can flow into said inlet port, through said cavity and said outlet port, said inlet conduit defining an orifice at its entrance into said cavity;

a bonnet assembly threadedly attached to said main body portion, said bonnet assembly having a longitudinal bore in communication with said cavity, said bore having an enlarged portion defining an internal chamber extending from said cavity to a circumferentially restricted portion defining a collar seat, an intermediate portion of smaller diameter than said internal chamber defining an elongated spring housing extending from said collar seat to another circumferentially restricted portion defining an annular shoulder, and a distal end portion of further reduced diameter defining an elongated valve guide extending from said shoulder to the distal end of said bonnet;

a valve stem slidably positioned within the bore of said bonnet assembly, one end of said valve stem having a tapered conical configuration for insertion into said orifice and the opposite end extending through said chamber, spring housing, and valve guide outwardly of and beyond said bonnet assembly, the portion of said valve stem within said chamber having an enlarged annular collar thereon of sufficiently large diameter to prevent its passage into said spring housing portion of said bore by seating against said collar seat;

bias means attached to said valve stem for normally urging said valve stem toward and into said orifice, said bias means including a coiled compression spring positioned in said spring housing in concentric relation to said valve stem with one end of said spring bearing against said collar and the opposite end bearing against said shoulder;

limit stop means associated with said valve stem for limiting the extent of longitudinal movement of said valve stem against the urging of said bias means toward and into said orifice, said limit stop means including an enlarged cap portion on said opposite end of said valve stem which extends outward of and beyond said bonnet assembly, and an external, longitudinally adjustable contact surface on the distal end of said bonnet assembly spaced radially outward from said valve stem and longitudinally outward from said bonnet assembly in alignment with said enlarged cap portion whereby the urging of said bias means on said valve stem normally maintains abutting contact of said cap portion on said contact surface, said contact surface thereby effectively limiting the inward longitudinal movement of said cap portion and said valve stem against the urging of said bias means; and rotatable adjustment means threadedly mounted concentric to said valve stem on an adjacent portion of said bonnet assembly, said contact surface being a part of said adjustment means, whereby rotation of said adjustment means in one direction results in longitudinal movement of said contact surface toward said orifice and rotation of said adjustment means in the opposite direction results in longitudinal movement of said contact surface away from said orifice.

6. The valve apparatus of claim 5, wherein said rotatable adjustment means is defined by a thimble and linearly spaced graduations are provided on a stationary portion of said bonnet assembly adjacent to said thimble to mark the relative longitudinal movement of said contact surface in relation to said orifice.

7. The valve apparatus of claim 6, wherein said linearly spaced graduations correspond to the pitch of the thimble mounting threads, and radially spaced graduations are also provided around the peripheral surface of said thimble to indicate fractions of revolutions of said thimble corresponding to fractional linear distances of movement along said linear graduations.

8. The valve apparatus of claim 7, including a packing seal around said valve stem at the distal of said bonnet assembly, a packing nut concentric to said valve stem and threadedly mounted on the main portion of said bonnet assembly for retaining said packing seal in place, and a sleeve slidably mounted over said packing nut, the external surface of said sleeve having defined thereon said linear graduations and threads which mate with said threads in said thimble.

9. The valve apparatus of claim 8, wherein said tapered, conical end of said valve stem is defined by a leading end diverging from a diameter smaller than the diameter of said orifice to an increased diameter toward the midsection of said valve stem which is larger than the diameter of said orifice, whereby said leading end can be inserted varying distances into said orifice to restrict the flow of fluid into said cavity through said orifice to a point where the diameter of said tapered section matches the diameter of said orifice at which point the flow of fluid through said orifice is effectively stopped.

* * * * *

UNITED STATES PATENT OFFICE
CERTIFICATE OF CORRECTION

Patent No. 4,099,703      Dated 11 July, 1978

Inventor(s) William Lush

It is certified that error appears in the above-identified patent and that said Letters Patent are hereby corrected as shown below:

Column 1, line 10, cancel "flat" and substitute -- flow --.

Column 4, line 13, cancel "thimbler" and substitute -- thimble --.

Signed and Sealed this

Fifth Day of June 1979

[SEAL]

Attest:

RUTH C. MASON
*Attesting Officer*

DONALD W. BANNER
*Commissioner of Patents and Trademarks*